United States Patent [19]

Ludwig

[11] Patent Number: 4,810,596
[45] Date of Patent: Mar. 7, 1989

[54] SULFURIC ACID THERMOELECTROCHEMICAL SYSTEM AND METHOD

[75] Inventor: Frank A. Ludwig, Rancho Palos Verdes, Calif.

[73] Assignee: Hughes Aircraft Company, Los Angeles, Calif.

[21] Appl. No.: 788,999

[22] Filed: Oct. 18, 1985

[51] Int. Cl.$^4$ .............................................. H01M 8/18
[52] U.S. Cl. ........................................ 429/17; 429/20; 429/105; 429/205
[58] Field of Search ................ 429/11, 17, 20, 105, 429/205

[56] References Cited

U.S. PATENT DOCUMENTS

| 646,348 | 3/1900 | Blumenberg et al. | 429/105 |
| 1,190,880 | 7/1916 | Emanuel | 429/105 |
| 1,251,412 | 12/1917 | Palmer | 429/205 |
| 2,310,354 | 2/1943 | Deysher | 429/11 |
| 3,231,426 | 1/1966 | Ludwig et al. | 429/11 |
| 3,253,955 | 5/1966 | Clampitt et al. | 429/11 |
| 3,536,530 | 10/1970 | Anthes et al. | 429/20 |
| 4,410,606 | 10/1983 | Loutfy et al. | 429/20 |

FOREIGN PATENT DOCUMENTS 0356023 11/1905 France ............................... 429/105

Primary Examiner—Donald L. Walton
Attorney, Agent, or Firm—M. E. Lachman; A. W. Karambelas

[57] ABSTRACT

A thermoelectrochemical system in which an electrical current is generated between a cathode immersed in a concentrated sulfuric acid solution and an anode immersed in an aqueous buffer solution of sodium bisulfate and sodium sulfate. Reactants consumed at the electrodes during the electrochemical reaction are thermochemically regenerated and recycled to the electrodes to provide continuous operation of the system.

8 Claims, 1 Drawing Sheet

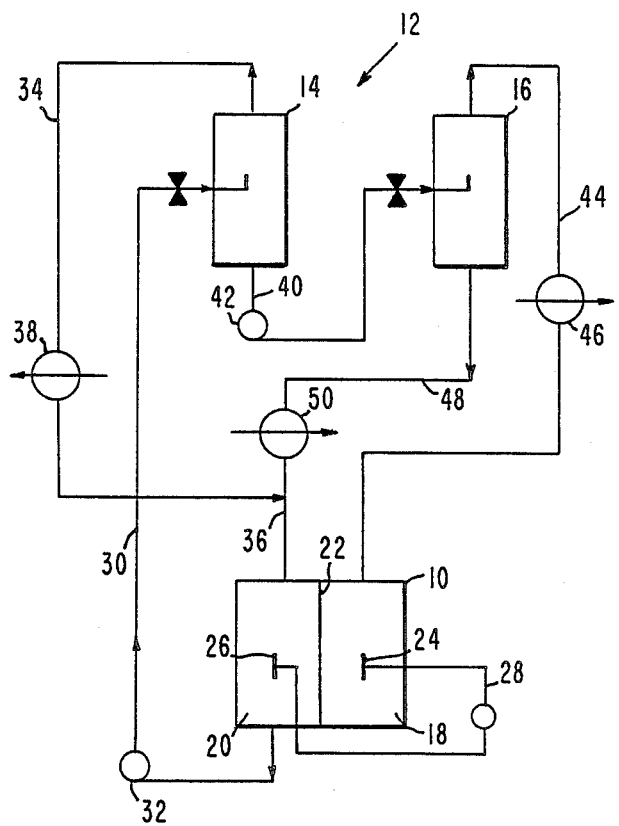

SULFURIC ACID THERMOELECTROCHEMICAL SYSTEM AND METHOD

This invention was made with Government support under Contract DE-AC03-83SF11942 awarded by the Department of Energy. The Government has certain rights in the invention.

BACKGROUND OF THE INVENTION

1. Field of the Invention

The present invention relates generally to batteries or fuel cells which convert thermal energy directly into electrical energy by use of a continuous concentration electrochemical cell. More specifically, the present invention relates to an improved battery based on the generation of an electric current utilizing a sulfuric acid ($H_2SO_4$) concentration gradient.

2. Description of the Background Art

U.S. Pat. No. 3,231,426, issued Jan. 25, 1966, discloses a continuous concentration cell in which a voltage is obtained and an electric current is generated between a cathode immersed in concentrated sulfuric acid and an anode immersed in dilute sulfuric acid. The reaction cycle which is set up between the electrodes is:

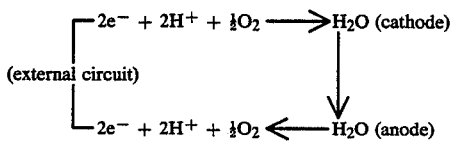

During operation of the cell, the concentrated sulfuric acid solution is diluted by water generated at the cathode, while the dilute sulfuric acid solution becomes more concentrated due to the generation of acid at the anode. The difference in acid concentration between the two solutions must be maintained in order to provide continuous generation of electrical energy. The system disclosed in U.S. Pat. No. 3,231,426 maintains the acid concentration gradient by heating the concentrated acid solution to distill off water generated at the cathode. The water which is continuously distilled from the concentrated acid solution is cycled to the dilute acid solution to continually provide dilution of the acid which is generated at the anode.

The above-described system is well suited for its intended purpose. However, during operation of the cell, large amounts of water must be continually distilled from the concentrated acid solution, recondensed and then cycled to the dilute acid solution. This distillation process is not energy efficient and requires additional equipment to handle the copious amounts of water which must be distilled and circulated during operation of the system. It would be desirable to provide a system and method in which a sulfuric acid gradient system is utilized to generate electric energy without requiring the energy inefficient distillation and circulation of relatively large amounts of water.

SUMMARY OF THE INVENTION

In accordance with the present invention, a system and method is provided which is based on the same principle of providing an electric current between a cathode immersed in concentrated sulfuric acid and an anode immersed in a dilute acid solution as set forth in U.S. Pat. No. 3,231,426, but wherein large amounts of water are not distilled, recondensed and cycled through the system. The present invention involves the discovery that a buffered solution containing sodium sulfate and sodium bisulfate can be substituted for the dilute acid anode solution in the previous sulfuric acid concentration cell. Use of this buffered solution instead of dilute acid allows the generation of electric energy without requiring distillation and recirculation of large amounts of water.

During operation of the system, sodium bisulfate is generated at the anode and sodium sulfae is consumed. As a feature of the present invention, the sodium bisulfate is thermally converted to sodium sulfate, water, and sulfur trioxide. The sodium sulfate and water are recycled to the anode solution to replenish sodium sulfate which is consumed. The sulfur trioxide is recycled to the concentrated sulfuric acid (cathode) solution where it combines with water generated or collected at the cathode to form sulfuric acid. This continual thermal conversion of sodium bisulfate provides continual replacement of the sodium sulfate and sulfuric acid consumed during operation of the system.

The thermoelectrochemical system in accordance with the present invention basically includes an electrochemical cell having a cathode compartment and an anode compartment. The two compartments have a common ion permeable separation wall. A cathode and an anode are located within their respective compartments with the cathode and anode being connectable externally from the system for generation of an electrical voltage and current between the electrodes.

A cathode solution composed of concentrated sulfuric acid is located in the cathode compartment for contact with the cathode. During operation of the system, water is generated or collected at the cathode and sulfuric acid is consumed. The system further includes an anode solution composed of an aqueous buffer solution containing sodium sulfate and sodium bisulfate. The anode solution is located in the anode compartment for contact with the anode. During operation of the system, sodium bisulfate is generated and sodium sulfate is consumed at the anode.

A thermochemical regenerator is provided for thermally converting sodium bisulfate generated at the anode to sodium sulfate and sulfur trioxide. Means for transferring the anode solution from the anode compartment to the thermochemical generator are also provided. Anode recycle means are provided for transferring the sodium sulfate and water formed in the thermochemical regenerator back to the anode compartment to replenish the sodium sulfate consumed during operation of the system. Cathode recycle means are also provided for transferring sulfur trioxide formed in the thermochemical regenerator back to the cathode compartment. The sulfur trioxide reacts with water formed in the cathode solution to form sulfuric acid which replenishes the sulfuric acid consumed during generation of the electrical current.

The system and method in accordance with the present invention is an improvement over the existing sulfuric acid concentration gradient electrochemical cells, since the distillation and recirculation of large amounts of water is not required. Further, the thermal conversion of sodium bisulfate to sodium sulfate and sulfur trioxide provides an energy efficient and simple means for continually replenishing chemicals consumed during operation of the cell to provide a continuous thermoelectrochemical system.

The above-discussed and many other features and attendant advantages of the present invention will become apparent as the invention becomes better understood by reference to the following detailed description when considered in conjunction with the accompanying drawing.

BRIEF DESCRIPTION OF THE DRAWING

The drawing is a schematic representation of a preferred exemplary system in accordance with the present invention.

DETAILED DESCRIPTION OF THE INVENTION

The present invention is an improvement upon sulfuric acid continuous concentration cells of the type disclosed in U.S. Pat. No. 3,231,426. The contents of this patent is hereby incorporated by reference.

A preferred exemplary system is shown in the drawing. The system basically includes an electrochemical cell 10 and a thermochemical regenerator shown generally at 12 which includes a flash boiler 14 and flash stripper 16.

The electrochemical cell 10 includes a cathode compartment 18 and an anode compartment 20. The cathode and anode compartments 18 and 20 are separated by a common ion permeable separation wall 22. The ion permeable separation wall 22 can be any of the common ion permeable membranes or other porous materials conventionally utilized in electrochemical cells to allow ion communication between the solutions present in the anode and cathode compartments. Preferred ion permeable membranes include conventional microporous polymer battery separators and anion exchange membranes. If cation exchange membranes are used, then sodium bisulfate is produced in both the anode and cathode compartments, and the effluent from both compartments would need to be heated and passed into thermal regenerators. A cathode 24 is located in the cathode compartment 18, with anode 26 being located in the anode compartment 20. The preferred cathode is a lead oxide ($PbO_2$) electrode, with the preferred anode being a lead sulfate ($PbSO_4$) electrode. Other electrodes, such as hydrogen or oxygen gas electrodes, may also be used as the anode or cathode if desired. However, the lead oxide and lead sulfate electrodes are preferred.

The cathode compartment 18 includes a cathode solution which is in contact with cathode 24. The cathode solution is preferably concentrated sulfuric acid. The concentration of the sulfuric acid is preferably maintained above at least 16 Molar. Concentrations of sulfuric acid as low as 5 Molar can be used; however, the open circuit voltage available from such a cell is correspondingly lower than the voltage obtainable from more concentrated acid solutions. It is preferred that the amount of water in the sulfuric acid be kept at a minimum so that the concentration of sulfuric acid remains close to 18 Molar.

An anode solution is located in the anode compartment 20 for contact with anode 26. The anode solution is an aqueous buffer solution containing sodium bisulfate and sodium sulfate. Preferably, the concentration of sodium bisulfate is between about 3-7 Molar, with the concentration of sodium sulfate being between approximately 0.1 to 0.5 Molar. Preferred concentrations are approximately 5 Molar sodium bisulfate and 0.2 Molar sodium sulfate. The electrochemical reactions at the electrodes are shown in Equations (1) and (2) below. At the cathode:

$$2e^- + 3H_2SO_4 + PbO_2 \rightarrow PbSO_4 + 2H_2O + 2HSO_4^- \quad (1)$$

At the anode:

$$PbSO_4 + 3Na_2SO_4 + 2H_2O \rightarrow PbO_2 + 4NaHSO_4 + 2e^- + 2Na^+ \quad (2)$$

The net reaction resulting from the above two half reactions is indicated in Equation (3).

$$H_2SO_4 + Na_2SO_4 \rightarrow 2NaHSO_4 \quad (3)$$

As can be seen from the net electrochemical reaction, sulfuric acid and sodium sulfate are consumed during the electrochemical reaction to produce sodium bisulfate. Sulfuric acid is consumed and water is generated or collected at the cathode, with sodium sulfate being consumed and sodium bisulfate being generated at the anode. In order for the electrochemical cell to continuously generate an electrical voltage and current, it is necessary to replenish the sulfuric acid and sodium sulfate consumed in the cell while at the same time removing excess sodium bisulfate. The regeneration of these reactants will be described in detail below.

The electrodes 24 and 26 are connectable to an external circuit schematically shown as 28 for generating an electrical current and voltage. The external circuit 28 can include electric motors or other systems for utilizing the electric energy generated by cell 10, or batteries or other suitable systems for storing the electric energy generated by cell 10. The temperature of cell 10 and the anode and cathode solutions therein is preferably maintained at temperatures below 100° C. and preferably near room temperature (25° C.).

In order to continually regenerate the sulfuric acid and sodium sulfate consumed during operation of cell 10, the anode solution is continually removed from the cell via line 30 and transferred to the thermochemical regenerator 12 utilizing pump 32 or other liquid transfer device. The anode solution transferred in line 30 contains sodium bisulfate and sodium sulfate in the same concentration as present in the anode compartment 20. The thermochemical regenerator 12 is designed to thermally convert the sodium bisulfate to sodium sulfate and sulfur trioxide.

The solution in line 30 is heated to a temperature of about 300° C. and introduced into flash boiler 14 where water is boiled off by the reaction shown in Equation (4).

$$2NaHSO_4 \rightarrow H_2O + Na_2S_2O_7 \quad (4)$$

The water which is boiled off in flash boiler 14 is recycled back to the anode compartment via lines 34 and 36. The water is cooled down to ambient or room temperature in heat exchanger 38 with the exchanged heat being used preferably to provide a portion of the heat necessary to heat the sodium bisulfate containing solution in line 30.

The sodium pyrosulfate ($Na_2S_2O_7$) is removed from the flash boiler 14 via line 40 and pump 42. The sodium pyrosulfate is further heated in line 40 to a temperature of approximately 450° C. and then introduced into flash stripper 16. In flash stripper 16, the reaction shown in Equation (5) takes place:

$$Na_2S_2O_7 \rightarrow Na_2SO_4 + SO_3 \qquad (5)$$

The sulfur trioxide formed in flash stripper 16 is separated from the sodium sulfate which is also formed in flash stripper 16 and the sulfur trioxide is transferred via line 44 to the cathode compartment 18. The sulfur trioxide is cooled down to ambient temperatures in heat exchanger 46 with the heat removed from the sulfur trioxide being preferably used to provide a portion of the heat for heating the sodium pyrosulfate in line 40 and/or the solution in line 30. The sulfur trioxide which is returned to the cathode compartment combines with water in the cathode solution to produce sulfuric acid. This provides continual replacement of the sulfuric acid which is consumed at the cathode 24 while at the same time consuming the water which is also produced or collected at cathode 24. The amount of sulfur trioxide introduced into the cathode solution through line 44 is regulated to maintain a relatively constant sulfuric acid concentration at or above the level necessary to generate an electric current. Water will pass through the ion permeable separation wall due to diffusion from the relatively water-rich anode solution to the relatively water-poor cathode solution. The water returned through line 36 is regulated to maintain a relatively constant water concentration.

The sodium sulfate produced in flash stripper 16 is separated from the sulfur trioxide and passed through lines 48 and 36 to the anode compartment 20. Heat exchanger 50 is provided to cool down the sodium sulfate to ambient temperatures (i.e., around 25° C.). The heat recovered in heat exchanger 50 is preferably used for providing at least a portion of the heat for heating the sodium pyrosulfate in line 40 and/or solution in line 30. The sodium sulfate which is recycled through lines 48 and 36 to anode compartment 20 replenishes the sodium sulfate consumed at the anode 26. The amount of sodium sulfate added to the anode compartment 20 and the amount of solution removed through line 30 are controlled so that a constant concentration of sodium sulfate and sodium bisulfate in the anode solution is maintained. This thermochemical regeneration and recycling process provides a means for maintaining the concentrations of the reactants in both the anode solution and the cathode solution at constant levels to thereby provide continuous generation of electrical energy from cell 10.

The hydrogen ions can undergo three types of reactions at the electrodes 24 and 26. The hydrogen ions can react with a hydrogen electrode to give hydrogen gas or they can react with oxide electrodes to give water or they can react with oxygen electrodes to give water. The first reaction is not desirable in sulfuric acid since hydrogen gas reduces sulfuric acid at 30° C. to provide sulfides which poison the hydrogen gas electrode catalysts. The third reaction is also not desirable since oxygen electrodes such as graphite paper-platinum composite and platinized tantalum electrodes are strongly kinetically hindered, even when catalyzed. This results in low efficiency and low power density devices. The second reaction has none of these drawbacks. As previously mentioned, a preferred oxide ion cathode is the conventional lead oxide electrode, with the preferred anode being lead sulfate.

As can be seen from the cathode and anode reactions for the present invention, the lead oxide cathode is converted to lead sulfate, with the lead sulfate anode being converted to lead oxide. Accordingly, new electrodes would periodically have to be introduced into the system as the original electrodes are consumed. More preferably, the two electrodes 24 and 26 would be periodically reversed so that the lead oxide cathode 24 when sufficiently converted to lead sulfate would be switched to become the anode 26, with the anode 26, now converted to lead oxide, becoming the cathode 24.

The above-described system has been experimentally tested using a lead oxide cathode 24 and lead sulfate anode 26. The cathode solution was 18 Molar sulfuric acid and the anode solution was 5 Molar sodium bisulfate and 0.2 Molar sodium sulfate. An open circuit voltage of 0.50 volts was obtained. High current densities at low electrode polarizations were maintained. In the thermochemical regeneration system, the sodium sulfate/sodium bisulfate solution in line 30 forms a molten salt as water is boiled off above 100° C. The system remains liquid between temperatures of 25° C. and 450° C. Thermal conversion rates of sodium bisulfate to sodium sulfate of from 7-23% were observed. The percentage conversion depends on the amount of water present in the system. Higher percent conversions appear to require adding water to the molten sulfate/bisulfate salt to keep it from solidifying due to excess sulfate being dissolved in the bisulfate.

Although the present system has been described for a single cell, it should be noted that a complete system would preferably consist of many electrodes stacked and manifolded in series or parallel arrangements for either high voltage or high current applications. This modular design of the system would allow it to be readily modified to either large or small energy systems.

The above-described system utilizes a thermoelectrochemical cycle which converts heat directly to electricity without the requirement of intermediate conversion to mechanical energy. The system has the advantages of no moving parts except for several very small pumps needed to circulate solutions through the system. The materials and solutions used in the system are conventional, low cost materials which are widely available. The system has a convenient upper temperature range in the thermochemical regeneration system of between 300° C. and 450° C. Electricity is produced over a low temperature range with the system operating at a high power density so that a lightweight, small device is possible. The conversion efficiency of the system is high and it can conveniently be used as a bottoming cycle in conjunction with other heat engines such as the sodium heat engine. Due to the fact that the sodium heat engine does not gain any efficiency in operation below 300° C., the present system is especially useful as a bottoming cycle for the sodium heat engine. The low temperature operation of the electrochemical cell provides further advantages in that the solutions can be pumped through low temperature lines and they can be stored without insulation and without sensible heat loss.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A thermoelectrochemical system for generating an electrical current comprising:
   (a) an electrochemical cell having a cathode compartment and an anode compartment, said compartments having a common ion permeable separation wall;
   (b) a cathode comparising lead oxide and an anode comprising lead sulfate located within their respective compartments, said cathode and anode being connectable externally of said cell for generation of said electrical current therebetween;
   (c) a cathode solution comprising concentrated sulfuric acid located in said cathode compartment and in contract with said cathode wherein water is generated or collected and sulfuric acid is consumed at said cathode during generation of said electrical current;
   (d) an anode solution comprising an aqueous buffer solution of sodium sulfate and sodium bisulfate located in said anode compartment and in contact with said anode wherein sodium bislufate is generated and sodium sulfate is consumed at said anode during generation of said electrical current;
   (e) thermochemical regenerator means for thermally converting sodium bisulfate to sodium sulfate, water, and sulfur trioxide;
   (f) means for transferring said anode solution from said anode compartment to said thermochemical regenerator;
   (g) anode recycle means for transferring sodium sulfate and water formed in said thermochemical regenerator back to said anode compartment to replenish the sodium sulfate consumed during generation of said electrical current; and
   (h) cathode recycle means for transferring sulfur trioxide formed in said thermochemical regenerator back to said cathode compartment, said sulfur trioxide reacting with the water formed in said cathode solution during generation of said electrical current to form sulfuric acid which replenishes the sulfuric acid consumed during generation of said electrical current.

2. A thermoelectrochemical system according to claim 1 wherein said thermochemical regenerator means includes:
   a flash boiler for thermally converting the sodium bisulfate to sodium pyrosulfate and water;
   a flash stripper for thermally converting the sodium pyrosulfate generated in the said flash boiler to sodium sulfate and sulfur trioxide; and
   means for transferring the sodium pyrosulfate from said flash boiler to said flash stripper.

3. A thermoelectrochemical system according to claim 1 wherein the concentration of sulfuric acid in said cathode solution is between approximately 16 to 18 Molar.

4. A thermoelectrochemical system according to claim 3 wherein the concentration of sodium bisulfate and sodium sulfate are between approximately 3 to 7 Molar and 0.1 to 0.5 Molar, respectively.

5. A method for generating an electrical current between an anode and a cathode comprising the steps of:
   (a) contacting a cathode comprising lead oxide with a cathode solution comprising concentrated sulfuric acid, said cathode and cathode solution being located in a cathode compartment, said cathode compartment having an ion permeable separation wall in common with an anode compartment;
   (b) contacting an anode comprising lead sulfate with an anode solution in said anode compartment, said anode solution comprising an aqueous buffer solution of sodium sulfate and sodium bisulfate, said cathode and anode being connectable for generation of said electrical current therebetween, and wherein water is generated or collected and sulfuric acid is consumed at said cathode during generation of said electrical current and wherein sodium bisulfate is generated and sodioum sulfate is consumed at said anode during generation of said electrical current;
   (c) removing anode solution containing sodium bisulfate from said anode compartment;
   (d) thermally converting the sodium bisulfate in the removed anode solution to sodium sulfate, water, and sulfur trioxide;
   (e) transferring the thermally generated sodium sulfate and water to said anode solution to replenish sodium sulfate consumed during generation of said electrical current; and
   (f) transferring the thermally generated sulfur trioxide to said cathode solution for reaction with water formed in said cathode solution during generation of said electrical current to form sulfuric acid which replenishes the sulfuric acid consumed during generation of said electrical current.

6. A method according to claim 5 wherein said sodium bisulfate is thermally converted by heating said sodium bisulfate to a sufficient temperature to thermally convert the sodium bisulfate to sodium pyrosulfate and then heating said sodium pyrosulfate to a sufficient temperature to thermally convert the sodium pyrosulfate to sodium sulfate and sulfur trioxide.

7. A method according to claim 5 wherein the concentration of sulfuric acid in said cathode solution is between approximately 16 and 18 Molar.

8. A method according to claim 7 wherein the concentrations of sodium bisulfate and sodium sulfate are between approximately 3 to 7 Molar and 0.1 to 0.5 Molar, respectively.

* * * * *